Figure 1:
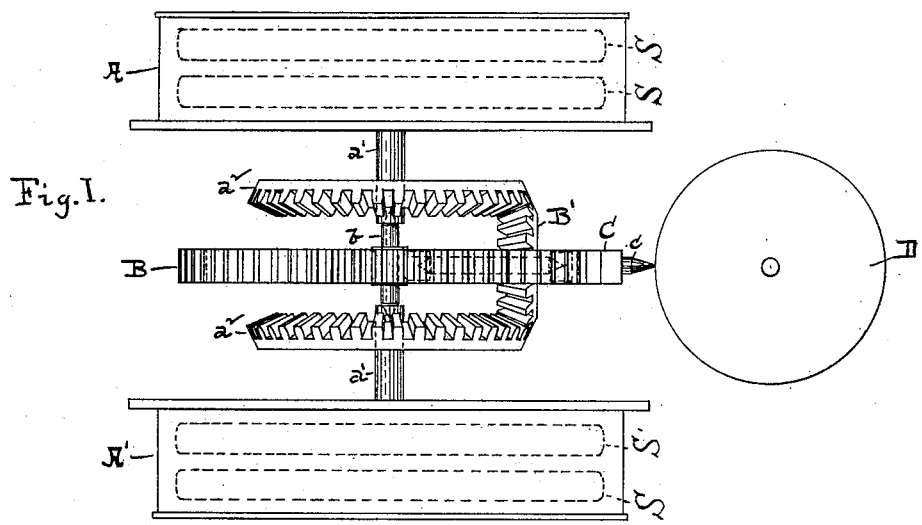

(No Model.)

C. HERSCHEL.
INSTRUMENT FOR RECORDING DIFFERENCES OF PRESSURE.

No. 417,245. Patented Dec. 17, 1889.

Witnesses.
F. L. Tuttle
J. E. Chapman

Inventor.
Clemens Herschel,
By Hawes & Chapman
Attorneys.

UNITED STATES PATENT OFFICE.

CLEMENS HERSCHEL, OF HOLYOKE, MASSACHUSETTS.

INSTRUMENT FOR RECORDING DIFFERENCES OF PRESSURE.

SPECIFICATION forming part of Letters Patent No. 417,245, dated December 17, 1889.

Application filed February 15, 1889. Serial No. 300,052. (No model.)

*To all whom it may concern:*

Be it known that I, CLEMENS HERSCHEL, of Holyoke, in the county of Hampden and State of Massachusetts, have invented a new and useful Improvement in Instruments for Recording Differences of Pressure, of which the following is a specification, reference being had to the accompanying drawings, forming part thereof.

In Letters Patent of the United States, No. 387,877, issued to me August 14, 1888, I have shown and described an apparatus for indicating and recording differences of pressure, in which I connect to the two pipes leading from two different sources of pressure a gage comprising two mercury-tubes capable of oscillating about a common pivot and in open communication with each other at one end. The displacement of the mercury in the two tubes by the differences of pressure in the two pipes causes the gage to move about its pivot, and such movement being recorded upon a sheet of paper by auxiliary mechanism a permanent record of the variations of the difference between the pressures in the two pipes, respectively, for any desired period of time is secured.

The object of my present invention is to provide an instrument having all the capabilities of that above mentioned, but which in its construction is much more simple, and which will be less liable to be damaged by rough usage, owing to the fact that the use of mercury-tubes is avoided.

In carrying out my present invention I utilize two pressure-gages, each of which is connected with one of the sources of pressure, and combine with said gages mechanism for recording the difference between the movements of their pointers or other indicating mediums. In order to thus secure a true record of the actual differences of pressure in the two pipes or other sources of pressure with which the two gages are connected, it is essential that the arc traversed by the pointer of each of said gages shall be equal throughout the range of the pointer for equal differences of pressure applied to the gage. As is well known, little or no attention has hitherto been given to the attainment of this result. In the ordinary Bourdon pressure-gage, for example, some of the tubes or "springs," as they are called, will cause the pointer to move over constantly-increasing arcs for equal differences of pressure applied from one end of the graduated scale to the other, while others of said springs will cause the pointer to move over constantly-decreasing arcs under like circumstances. It becomes necessary in the first place, therefore, to overcome this objection to the ordinary operation of the two pressure-gages themselves, and I accomplish this result by using in each gage two of said springs, side by side, one having the tendency to cause the pointer to move over a constantly-increasing arc, and the other having the reverse tendency, and by connecting both of said springs to the same pointer, thus causing them to equalize each other and move the pointer over equal arcs for equal differences of pressure throughout its range of movement. A further result secured by the use of two springs in each gage instead of one is to make the action of the gages more persistent and render them better qualified to operate the auxiliary recording mechanism. Having thus equipped two pressure-gages whose respective pointers, or axes on which the pointer is usually mounted, will move in each gage with the uniformity throughout their range of movement above described, I cause such angular movement of these axes to be subtracted the one from the other by suitable mechanism, and the resulting motion to be indicated by the motion of another axis; and this last-named axis is caused to move the pen over the paper of any of the ordinary forms of paper-register mechanism.

My invention therefore consists in the instrument embodying the above-mentioned features, hereinafter fully described, and particularly pointed out in the claims.

Figure 2:
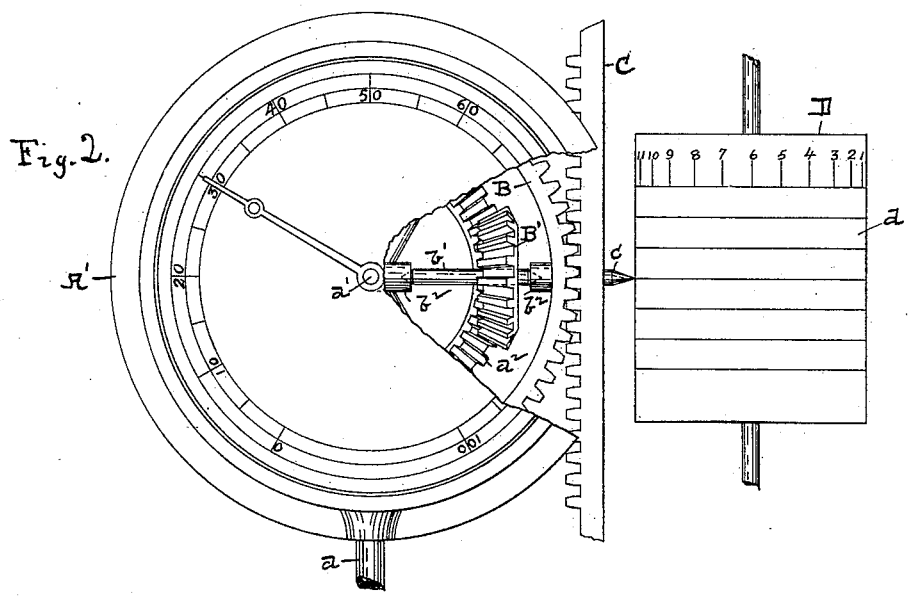

Referring to the drawings, in which like letters designate like parts in the several figures, Figure 1 is a plan view of the instrument devised by me. Fig. 2 is a side elevation thereof with one of the pressure-gages broken away in part to show the mechanism behind it.

The letters A A' designate two pressure-gages which in the example shown differ from the ordinary Bourdon gage only in having two or more tubes or springs connected with the axes of their pointers instead of a single spring. As hereinbefore stated, the object of using a plurality of springs in each gage is to enable them to equalize each other in such manner as to cause the pointers of said gages to move over equal arcs for equal differences of pressure uniformly throughout their range of movement. I have indicated the position occupied by said springs by broken lines at S in Fig. 1, and as in all other respects the gages A A' are or may be identical with the ordinary form of such gages I have deemed it to be unnecessary to show the interior construction thereof. Pipes $a$ connect said gages with the sources of pressure in the usual manner. At the rear side of said gages their axes, upon which their pointers are mounted, are extended a short distance beyond the casings, as shown at $a'\ a'$, and keyed upon said axes near their adjacent ends are corresponding bevel gear-wheels $a^2\ a^2$. The wheels $a^2\ a^2$ will therefore move about their axes uniformly with the pointers of their respective gages, and for the purpose of subtracting the motion of said wheels one from the other and making a permanent record of the result I utilize the following mechanism.

The letter B designates a gear-wheel mounted upon an axis $b$, the ends of which axis are preferably conical in shape and rest in conical bearings in the ends of the axes $a'\ a'$, as shown, whereby said wheel B is capable of free revolution independently of the gear-wheels $a^2\ a^2$. Radially disposed within said wheel B is an axis $b'$, the ends of which are also preferably made conical and are received in bearings $b^2\ b^2$ at the center and the rim of said wheel, respectively. Upon said axis $b'$ is mounted a bevel-gear B', which meshes with both of the gear-wheels $a^2\ a^2$. Said wheels $a^2\ a^2$ and the gear B' thus form what is known as an "epicyclic" train of gears, in which so long as the wheels $a^2\ a^2$ move uniformly in opposite directions the gear B' will receive simply a revolving movement about its own axis; but whenever the movement of one of said wheels $a^2\ a^2$ exceeds that of the other said gear B' will receive both a revolving movement about its axis and also a bodily movement about the axes $a'\ a'$ $b$ as a center, corresponding to the differences between the movements of said wheels $a^2\ a^2$. By recording the amount of such bodily movement of said gear B', therefore, an accurate record of the variations in the pressures in the two pipes connected with gages A A' can be secured, and in the example shown I employ for making such record a rack-bar C, the teeth of which mesh with those on the wheel B, said rack-bar carrying a pencil $c$ or other marking medium, which traces a line upon the paper $d$, carried by the cylinder D, of any of the usual forms of recording-machines in which such cylinder receives a uniformly-revolving movement. Any bodily movement of the gear B' is thus instantly communicated to the rack-bar through the wheel B, and the line traced upon the paper $d$ constitutes a permanent record of the differences of pressure in the pipes $a\ a$ during any given period of time.

The instrument thus constructed is adapted to be used wherever it is desired to record differences of pressure; but I have devised it especially for use in connection with the Venturi water-meter shown and described in Letters Patent No. 381,373, issued to me on the 17th day of April, A. D. 1888, for making a record of the differences of pressure in the two pipes leading from different points in the adjutage.

It is obvious that modifications in the various details of construction shown and described herein can be made without departing from the spirit of my invention.

Having thus fully described my invention, what I claim, and desire to secure by Letters Patent, is—

1. The instrument for recording differences of pressure herein described, consisting of two pressure-gages each having an axis carrying one gear of a train of gears by which the angular motions of said axes are subtracted the one from the other and the resulting motion transmitted to a third axis, a rack-bar carrying a marking-instrument, and a gear connecting said rack-bar with said third axis, whereby movement of the latter will be transmitted to the former, substantially as set forth.

2. In an instrument for recording differences of pressure, two pressure-gages each having its axis operatively connected with a plurality of Bourdon springs, part of which have a tendency to move said axis with an increasing ratio for equal degrees of pressure applied thereto and the remainder of which have the reverse tendency, whereby the axes of said gages are caused to move uniformly throughout their range of movement by equal degrees of pressure applied to said gages, in combination with an epicyclic train of gears connecting the axes of said gages with a third axis, a bar carrying a marking-instrument, and gear-connections, substantially as described, between said bar and said third axis, whereby a linear movement is imparted to the former from the latter, substantially as set forth.

3. The instrument for recording differences of pressure herein described, consisting of two pressure-gages each having an axis carrying a bevel-gear at or near one end, an intermediate bevel-gear meshing with both of said first-mentioned gears and mounted upon an axis turning in bearings which are radial to and movable about the line of the axes of said gages as a center, a marking-instrument mounted upon a carrier which moves in a line tangential to the path of movement of the outer bearing of said intermediate gear, and a positive intermediate connection between said carrier and said outer bearing of the intermediate gear, substantially as described, whereby any movement of the intermediate gear about the axes of said gages as a center will be transmitted to said carrier.

4. The recording-instrument herein described, consisting of the pressure-gages A A', having their axes $a'$ in one and the same straight line and having gears $a^2 a^2$ mounted upon said axes, gear-wheel B, having its axis $b$ in alignment with and between the axes $a'$, gear B', mounted upon an axis radially disposed within wheel B and meshing with said gears $a^2$, rack-bar C, meshing with said gear-wheel B and carrying the marker $c$, and revolving cylinder D carrying the paper $d$, combined and operating substantially as and for the purpose set forth.

5. In a recording-instrument, the pressure-gages A A', each having its axis operatively connected with a plurality of Bourdon springs, bevel-gears $a^2 a^2$, mounted upon the axes of said gages respectively, wheel B, carrying gear B', meshing with said gears $a^2 a^2$, and bar C, operatively engaging said wheel B and carrying marker $c$, combined and operating substantially as set forth.

6. In a recording-instrument, pressure-gages A A', having axes $a' a'$, carrying gears $a^2$, and having conical bearings in their adjacent ends, wheel B, having its axis $b$ provided with conical ends and mounted in said bearings, gear B', having its axis $b'$ mounted in bearings $b^2$ at the center and rim of said wheel B, respectively, bar C, engaging the periphery of said wheel B, marker $c$, carried by said bar, and a uniformly-movable support for a sheet of paper located adjacent to said marker, combined and operating substantially as described.

CLEMENS HERSCHEL.

Witnesses:
W. H. CHAPMAN,
J. E. CHAPMAN.